UNITED STATES PATENT OFFICE.

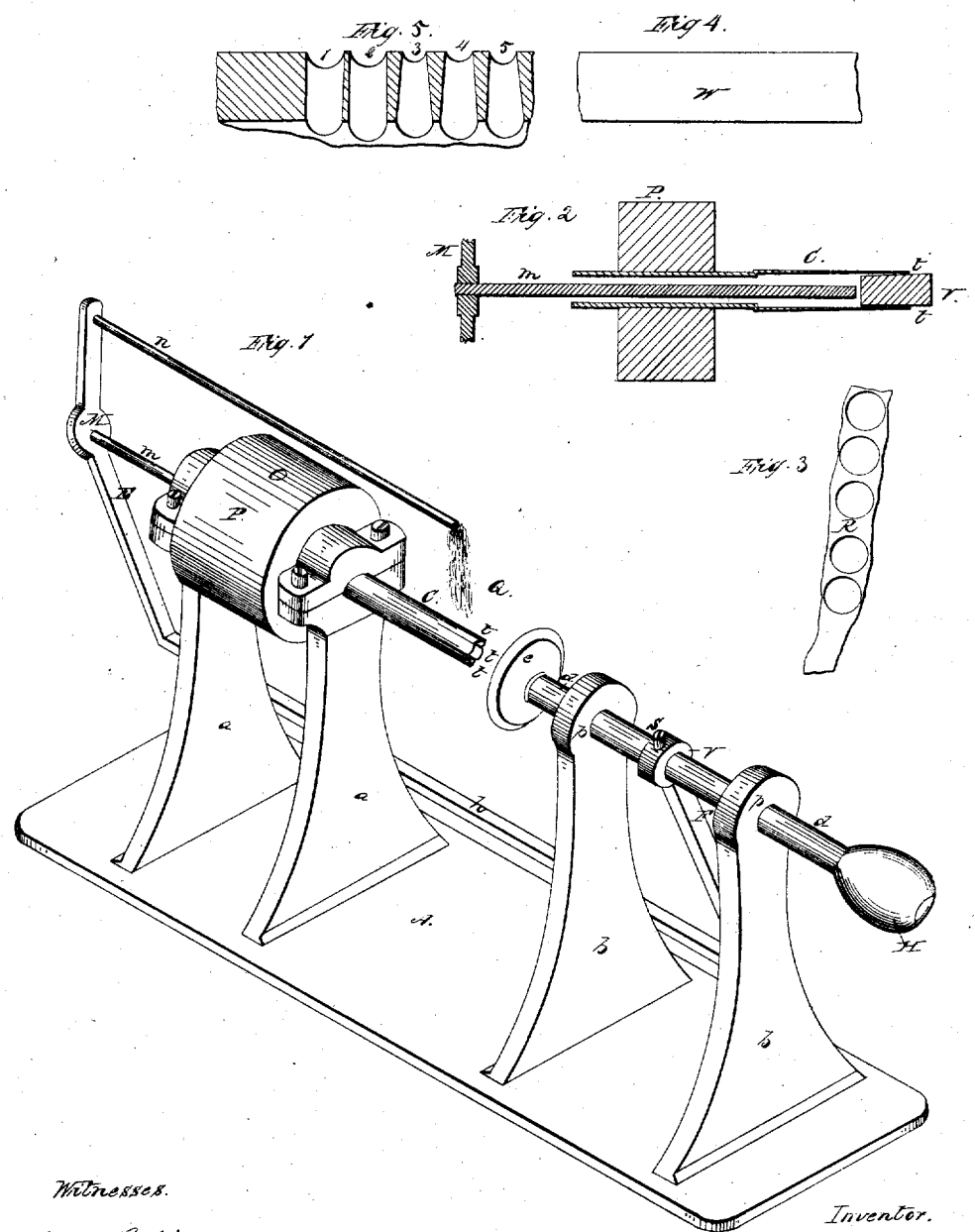

WM. R. CROCKER, OF NORWICH, CONNECTICUT.

MACHINE FOR MANUFACTURING CORKS.

Specification forming part of Letters Patent No. 13,714, dated October 30, 1855; Reissued December 5, 1871, No. 4,654.

*To all whom it may concern:*

Be it known that I, WILLIAM R. CROCKER, of Norwich, in the county of New London and State of Connecticut, have invented a new and useful Improvement in Machines for Making Corks; and I do hereby declare that the following is a full, clear, and exact description of the construction and operation of the same, reference being had to the annexed drawing, making part of this specification.

Figure I is a view of the machine in isometrical perspective. Fig. II is a longitudinal section of the revolving cylindrical cutter, &c.

A Fig. I is the base which is a plate of cast iron which for the machine herein described, being one of the smallest size used by me, is ten inches long three inches broad and one quarter of an inch thick.

*a, a,* and *b, b,* are stands connected with and cast on the base A. The stands *a, a,* support the journals of the revolving shaft or cutter *c,* and *b, b* support the sliding shaft *d, d.*

*c* is a revolving cylindrical cutter having journals to bear in the stands *a, a,* and made concave, through its whole length with a circular knife edge at *t* and in some cases having four longitudinal slots from the cutting edge of nearly the length of cork designed to be cut. The diameter of the cutter corresponds with the diameter of the cork to be cut, at its largest end. A longitudinal section of this cutter with some of its appendages is shown at *c* Fig. 2. The inside diameter of the cutter for the machine under consideration is seven sixteenths of an inch, and the cylindrical portion of the cutter is made as thin as possible consistent with tenacity and strength, a slight taper is given to the outside to insure a cutting edge, the concavity within is uniform in size for about one and three quarter inches from the cutting edge and near to one of its journals, and it is uniform in size on the outside from the journals so far as is necessary to meet the taper from the cutting edge. Between the journals is a pulley about two inches in diameter fastened to the cutter by a set screw. The space occupied by the journals and pulley is made a little smaller, both externally and internally, as it is not necessary to maintain its full or greatest size except so far as is required for cutting and receiving the cork.

*d d* is a sliding shaft about six inches long and three eighths of an inch in diameter, fitted so as to slide freely in the stands *b b* and is connected firmly to the arm F of the frame F, *h,* E by the set screw *s.* *e* is a disk on the end of the sliding shaft, having a face on the side next the cutter at right angles to the axis. H serves as a handle on the sliding shaft, by which it may be moved toward or from the revolving cutter *c.*

*m* is a rod or wire, made fast in the arm E, and runs loosely into the cavity of the revolving cutter, so that when the sliding shaft *d, d,* is moved, it causes the frame F, *h,* E and also the rod *m* to be moved also. The arm F is connected with the sliding shaft in such position that the hub *v* shall strike the stand at P without allowing the disk *e* to come in contact with the knife edge of the cutter; and the hub *r* will also strike the other stand at *q* without allowing the extremity of the rod *m* to pass beyond the cutting edge toward the disk *e.*

Fig. IV is a block of cork wood so cut as to present two opposite parallel sides, the distance of which shall be equal to the length of cork to be cut. This is held by the operator so that one of the parallel faces of the block shall rest against the face of the disk *e* when by crowding the sliding shaft forward toward the face of the revolving cutter. A cylindric piece of the cork is separated from the block and received into the cavity of the cutter, when by drawing the sliding shaft back again, the rod *m* is moved with it, and throws the cork out perfectly cut and it drops into any receptacle to receive it.

Fig. III represents a block of cork with one of the parallel faces toward the observer and after having been through the operation, a cork having been cut from such of the circular cavities therein represented.

V Fig. II represents a cork within the cavity of the cutter and partially pressed forward by the rod in process of being thrown out.

*n* is a rod or wire fastened to the extremity of the arm E, and having a piece of cloth or some yarn pendent from the end, the lower edges of which touch the cylindrical cutter which it is designed to keep moistened with oil with which the cloth or yarn is saturated.

When it is designed to cut conical or tapering corks the cutter is slit or slotted as shown at Fig. I. Its operation is as follows: The concavity being entirely cylindrical, the outside is slightly beveled off to produce a perfect knife edge which has a tendency while cutting to crowd the lips off of the cutter inward toward the center, and as these are made very thin, and have a spring temper, they are susceptible of contraction, as they are forced into the block cutting it gradually smaller as it progresses from the first to the last end, the limits of this contraction is when the lips are brought together which may be varied by the width of the slots between the lips.
For cutting plane or cylindrical corks a plane cutter with a simple circular knife edge is used which in every other respect is similar to the one above described.

The speed of the revolving cutters as I usually run them is from 300 to 600 revolutions per minute. The cutters are sharpened by simply holding a whetstone in contact with the edge while running.

The operation of the machine is such as to cut the cork perfectly true and smooth when the blocks are properly prepared and whether conical or cylindrical to cut them with rapidity and to dispose the material with the greatest economy.
Fig. V represents a perspective view of a section of a block or slab after the corks have been cut from it. Numbers 1 and 2 are plain or cylindrical and numbers 3, 4 and 5 are tapering or conical. When the corks are required to be much tapering a great number of slots should be made in the cutter in order that it may suffer greater contraction.

What I claim as my invention and for which I solicit Letters Patent is—

The application of the revolving cylindrical cutters to cut cork from a block or slab as herein described whether the cutters are slit to cut tapering or conical, or unslit to cut cylindrical corks.

I do not claim a cylindrical cutter, but this mode of construction use and application allowing myself the privilege of varying the same in detail while the principle and distinguishing characteristics are retained.

WILLIAM R. CROCKER.

Signed in presence of—
GEORGE PERKINS,
SAML. C. MORGAN.

---

*To the Commissioner of Patents:*
Your petitioner, MARY F. CROCKER, of West Winsted, in the State of Connecticut, as administratrix *de bonis non* of the estate of WILLIAM R. CROCKER, deceased, late of Norwich, said State, respectfully represents 70. that she has, by virtue of letters of administration become possessed of Letters Patent granted to her late husband, the said WILLIAM R. CROCKER, on the 30th day of October, 1855, for improvement in machines for manufacturing corks; that she has reason to believe that through inadvertence, accident or mistake the specification and claim of said Letters Patent are too broad, including that of which said patentee was not the first inventor.

Your petitioner therefore hereby enters a disclaimer to "a revolving cylindrical cutter when unslit to cut cylindrical corks" in the claim of the specification of said Letters Patent mentioned.

MARY F. CROCKER,
*Administratrix de bonis non of the estate of William R. Crocker, deceased.*

Witnesses:
EDWARD LYON, Jr.,
A. B. MALCOMSON, Jr.

[FIRST PRINTED 1912.]